(12) United States Patent
Schuette

(10) Patent No.: US 11,104,083 B2
(45) Date of Patent: Aug. 31, 2021

(54) METHOD AND DEVICE FOR JOINING A LENS WITH A HOUSING OF A LIGHTING DEVICE FOR A MOTOR VEHICLE

(71) Applicant: HELLA GmbH & Co. KGaA, Lippstadt (DE)

(72) Inventor: Andreas Schuette, Bueren (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 16 days.

(21) Appl. No.: 16/288,851

(22) Filed: Feb. 28, 2019

(65) Prior Publication Data

US 2019/0193343 A1 Jun. 27, 2019

Related U.S. Application Data

(63) Continuation of application No. PCT/EP2017/071309, filed on Aug. 24, 2017.

(30) Foreign Application Priority Data

Aug. 30, 2016 (DE) .................... 10 2016 116 137.3

(51) Int. Cl.
*B29C 65/00* (2006.01)
*B29C 65/06* (2006.01)
(Continued)

(52) U.S. Cl.
CPC .............. *B29C 66/95* (2013.01); *B29C 65/02* (2013.01); *B29C 65/06* (2013.01); *B29C 65/782* (2013.01);
(Continued)

(58) Field of Classification Search
CPC ....... B29C 65/02; B29C 65/06; B29C 65/782; B29C 66/114; B29C 66/131;
(Continued)

(56) References Cited

U.S. PATENT DOCUMENTS

| 6,017,141 A * | 1/2000 | Sugiyama | ........... B29C 65/0618 |
| | | | 362/520 |
| 6,089,731 A | 7/2000 | Sugiyama et al. | |
| 2003/0094240 A1* | 5/2003 | Sarmiento | ........... B29C 66/0242 |
| | | | 156/379.8 |

FOREIGN PATENT DOCUMENTS

| DE | 102010024169 A1 * | 12/2011 | .............. F21S 41/29 |
| GB | 2325638 A | 12/1998 | |

(Continued)

OTHER PUBLICATIONS

Translation of DE-102010024169-A1, Achim Bathe, Dec. 2011 (Year: 2011).*

(Continued)

*Primary Examiner* — George R Koch
(74) *Attorney, Agent, or Firm* — Muncy, Geissler, Olds & Lowe, P.C.

(57) ABSTRACT

A method for joining a lens with a housing of a lighting device for a motor vehicle, having the steps: positioning the housing in a receiving device of a welding device, said housing having on its underside at least one fastener for attaching the lighting device in the motor vehicle, identifying the position of the at least one fastener relative to the receiving device, calculating a correction value on the basis of the identified position of the at least one fastener, and moving the lens held in a holding device of the welding device in the direction of the housing along a travel distance and welding the lens to the housing.

10 Claims, 1 Drawing Sheet

(51) Int. Cl.
  *B29C 65/78*  (2006.01)
  *B29C 65/02*  (2006.01)
  *F21S 43/27*  (2018.01)
  *B29L 31/30*  (2006.01)
  *B29L 31/00*  (2006.01)

(52) U.S. Cl.
  CPC .......... *B29C 66/114* (2013.01); *B29C 66/131* (2013.01); *B29C 66/542* (2013.01); *B29C 66/9261* (2013.01); *B29C 66/961* (2013.01); *F21S 43/27* (2018.01); *B29C 66/954* (2013.01); *B29L 2031/30* (2013.01); *B29L 2031/747* (2013.01)

(58) Field of Classification Search
  CPC . B29C 66/542; B29C 66/924; B29C 66/9261; B29C 66/92611; B29C 66/92613; B29C 66/92615; B29C 66/9231; B29C 66/92311; B29C 66/929; B29C 66/95; B29C 66/954; B29C 66/961; B29L 2031/30; B29L 2031/747; F21S 43/27
  See application file for complete search history.

(56) References Cited

FOREIGN PATENT DOCUMENTS

| | | |
|---|---|---|
| JP | 2011258391 A | 12/2011 |
| JP | 2016078248 A | 5/2016 |

OTHER PUBLICATIONS

International Search Report dated Nov. 22, 2017 in corresponding application PCT/EP2017/071309.

\* cited by examiner

METHOD AND DEVICE FOR JOINING A LENS WITH A HOUSING OF A LIGHTING DEVICE FOR A MOTOR VEHICLE

This nonprovisional application is a continuation of International Application No. PCT/EP2017/071309, which was filed on Aug. 24, 2017, and which claims priority to German Patent Application No. 10 2016 116 137.3, which was filed in Germany on Aug. 30, 2016, and which are both herein incorporated by reference.

BACKGROUND OF THE INVENTION

Field of the Invention

The present invention relates to a method for joining a lens with a housing of a lighting device for a motor vehicle. Furthermore, the invention relates to a device for carrying out a corresponding method.

Description of the Background Art

For joining and thus cohesively bonding a lens to a housing of a lighting device for a motor vehicle, it is known, for example, to use a relative welding process. In this case, the lens is lowered in the direction of the housing, or the housing is raised, until the welding contour of the lens forming the joining portion of the lens is placed on the welding contour of the housing forming the joining portion of the housing. The initial value calculated by the position measuring system of the machine is stored by a control unit for the subsequent joining process. This ensures a uniform welding depth between the lens and the housing in each lighting device to be created. However, in this case it is not possible for any tolerances to be compensated, in particular between the top surface of the lens facing away from the housing, and the fastener for attaching the lighting device to a body of a motor vehicle attached to an underside of the housing, since the fastener and the housing for bolting the lighting device to the vehicle are subject to tolerance and may therefore have different lengths. As a result, the vehicle-mounted lighting devices may protrude or indent to a different extent from the outer skin of the vehicle, thus making it impossible to comply with the dimensional accuracy required by the manufacturer.

Further, it is known to use an absolute welding process for materially joining a lens with a housing of a lighting device for a motor vehicle. In such an absolute welding process, without taking the tolerances of the welding contour of the lens and the tolerances of the housing into account, the lens is always moved by the same travel distance downward in the direction of the housing, or the housing is moved towards the lens. Thus, in a welded state of the lens to the supporting edge of the housing for bearing in the receiving device, the top surface of the lens can always have a constant, known height above the welding contour, and thus the edge portion of the housing. However, this also results in the vehicle-mounted lighting devices protruding or being indented to different extents from the outer skin of the vehicle, thus preventing a high degree of dimensional accuracy.

SUMMARY OF THE INVENTION

It is therefore the object of the present invention to provide a method by which the dimensional accuracy of a lighting device can be improved.

In an exemplary embodiment, the method for achieving the object according to the invention comprises the following steps: positioning the housing in a holding device of a welding device, said housing having on its underside at least one fastener for the attachment of the lighting device in the motor vehicle, identifying the position of the at least one fastener relative to the receiving device, calculating a correction value based on the identified position of the at least one fastener, and moving the lens held in a holding device of the welding device in the direction of the housing along a travel distance, and welding the lens to the housing by means of welding, wherein the length of the travel distance is corrected using the correction value in such a way, that in a welded state of the lens to the housing, a defined target height of the lighting device is created, measured from the reference surface of the at least one fastener to the top surface of the lens facing away from the housing.

Via a correction of the travel distance of the lens, based on a measurement of the at least one fastener disposed on the housing, individually for each manufactured lighting device, a predetermined defined distance between the top surface of the lens and the reference surface of the fastener, and thus a defined consistent overall height of the joined lighting device, can be obtained during the joining process. The fastener is, for example, designed as a screw dome, wherein the reference surface furthermore is, for example, a front face or end face of the screw dome.

Both tolerances in the fastener due to different lengths, for example, of the screw domes and thus its end faces, and tolerances due to dimensional deviations in the plastic housing and the plastic lens can thereby be compensated. When installing such joined lighting devices in the body of a motor vehicle, it can be ensured that they always align flush with the outer skin of the motor vehicle and there are no variations in the position of the built-in lighting device relative to the outer skin of the motor vehicle. Thus, when installing a lighting device in a motor vehicle, the dimensional accuracy can be substantially increased.

In the context of the invention, the inventive device for joining includes any device that is used for the arrangement of a lens on a housing of a lighting device, wherein the joining includes positioning of the lens. The concept of joining in this case is understood to be any type of arrangement, positioning and/or orientation with or without an attachment or a cohesive, non-positive or frictional connection between the joining partners. Thus, the joining device does not necessarily have to be designed for a cohesive connection of the two joining partners. Consequently, in the present case, a joining can also be understood to mean a process which is essentially or exclusively aimed at positioning the joining partners with respect to one another.

The housing can be positioned in the receiving device such that the at least one fastener and thus the contact area with its reference surface is oriented in the joining direction towards an inner surface of the receiving device. This achieves a defined position of the fastener and thus the reference surface relative to the receiving device, whereby identifying the position of the at least one fastener and thus the reference surface relative to the receiving device can be facilitated.

The position of the at least one fastener and thus of the reference surface can preferably be determined by identifying a distance between the reference surface of the at least one fastener and the inner surface of the receiver. The inner surface of the receiver may then form a type of fixed defined zero line, which can serve as a basis for defining the travel distance of the lens and for calculating the correction value.

In this case, the reference surface of the fastener forms that surface with which the lighting device adjoins a receiver in the vehicle for the defined installation, or with which the installation height is definitively supported. Consequently, the reference surface must not necessarily form the front face or the end face of the entire screw dome and may for example be formed by a collar or the like of a freely customizable fastener, thus for example also a mounting hole in the housing.

Identifying the position of the at least one fastener or the contact surface may preferably be done by means of a sensor element, which is designed as a distance measuring element. The sensor element may preferably be arranged in the receiving device, in particular on the inner surface of the receiving device, so that the sensor element may be arranged opposite the at least one fastener and thus the reference surface, thereby identifying the position of the fastener and thus the reference surface without disruptive effects.

The calculated correction value is preferably transmitted to a control unit of the welding device which controls the travel distance of the lens or the housing. Within the control unit, the correction value can then be immediately taken into account to be able to optimally and definedly control the absolute travel of the lens in the direction of the housing during the joining process. Therefore, this does not constitute a fixed absolute travel but instead differential movement, which is corrected for each individual joining process, and therefore the method can be characterized as differential movement welding.

Upon reaching the specified target height, the welding operation for sealing the lens to the housing is preferably immediately terminated. This can ensure that all lighting devices to be joined always reach the constant target height and do not deviate therefrom. Thus, very high process reliability can be achieved.

The welding can take place, for example, by means of a concurrent ablation process. By means of the concurrent ablation process, a firm joint or welded connection can be formed between the lens and the housing within a short time.

If two or more fastener and thus reference surfaces are arranged at the underside of the housing, the position of the two or more fastener arranged at the underside of the housing can be identified, wherein then, a mean value can be calculated from the identified positions of the fastener or their reference surfaces, and on the basis of the mean value, the correction value can then be calculated, by means of which the travel distance of the lens or of the housing can be corrected. In this way, all fastening points, i.e., the fastener for fastening the lighting device to the motor vehicle, formed on the housing can be equally considered, whereby dimensional accuracy can be further improved.

The object of the invention is further achieved by means of a welding device for performing a method as described, designed and refined above, having a receiver for receiving and positioning the housing, a holding device for holding and moving the lens, and a weld allowance for welding the lens to said housing, wherein the receiver has a sensor element by means of which the position of the at least one fastener of the housing relative to the receiver can be identified so that on the basis of the identified position, a correction value can be calculated and the lens can be moved along a travel distance when welding to the housing, wherein the length of the travel distance is correctable by means of the correction value in such a way, that in a welded state of the lens to the housing, a defined target height of the lighting device is obtained, measured from the reference surface of the at least one fastener to the top surface of the lens facing away from the housing.

The sensor element can be positioned on an inner surface of the receiver.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
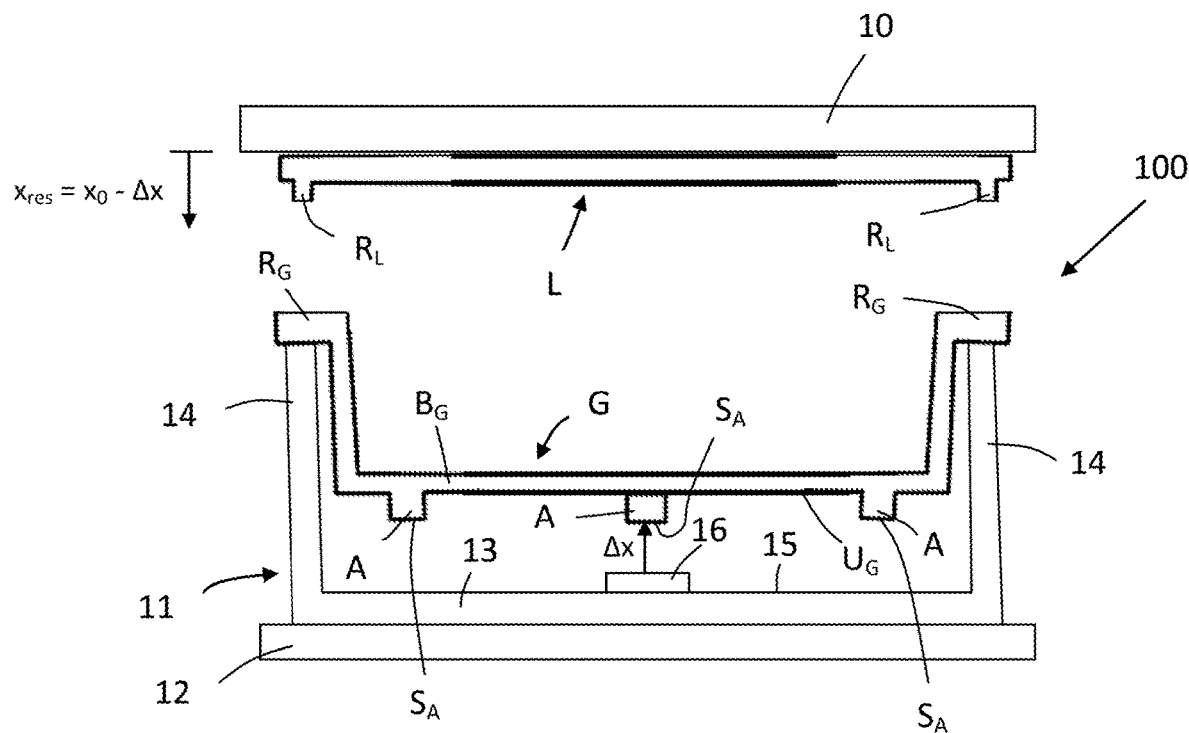
FIG. 1 is a schematic representation of a welding device for joining a lens with a housing of a lighting device at the beginning of a joining process according to the invention.

FIG. 1 shows a welding device 100, by means of which a lens L constructed of a plastic can be cohesively connected to a plastic housing G of a lighting device.

The lens L is arranged on a holding device 10, wherein by means of the holding device 10, the lens L can be moved down or lowered in the direction of the housing G.

The housing G is positioned in a receiving device 11, which in turn is connected fixed in position to a base plate 12. The receiving device 11 has a receiving collar 14 projecting upwardly from a bottom plate 13 of the receiving device 11, on which the housing G can rest with its edge region $R_G$, which also forms the joint portion of the housing G. The receiving device 11 thus has a U-shape in cross-section. The receiving collar 14 forms a support surface for the joint portion of the housing G so as to absorb the forces acting on the edge region $R_G$ of the housing G that forms the joint portion during joining. The housing G thereby rests on the receiving collar 14 in such a way, that the bottom $B_G$ of the housing G is arranged freely suspended in the receiver 11. The underside $U_G$ of the housing G, which forms the underside $U_G$ of the bottom $B_G$ of the housing G, is thus arranged spaced apart from an inner surface 15 of the receiving device 11. In the embodiment shown here, several fastener A in the form of screw domes are arranged at the underside $U_G$ of the housing G, which protrude from the underside $U_G$. The fastener A are used to fasten the housing G and thus the finished, joined lighting device B in the motor vehicle, particularly on the body of the motor vehicle, by passing screws through the fastener A. The fastener A are also formed of plastic and are equally molded in the injection molding process when the housing G is formed.

After positioning the housing G in the receiving device 11, prior to beginning the actual welding operation, first the position of one or more of the fastener A relative to the receiving device 11 is identified. In this case, the lens L is still positioned at a distance from the housing G, as can be seen in FIG. 1. The position of one or more of the fastener A is identified by means of a sensor element 16.

The housing G is positioned in the receiver 11 in such a way that the fastener A are oriented with their reference surface $S_A$ toward the inner surface 15 of the receiver 11. The position of one or more of the fastener A is determined by the sensor element 16, by identifying the distance between the reference surface $S_A$ of one or more of the fastener A and the inner surface 15 of the receiving device 11.

From the identified position of one or more of the fastener A, wherein the reference surfaces $S_A$ of the fastener A respectively serve as a reference point, a correction value $\Delta x$ is calculated. This calculated correction value $\Delta x$ is transmitted to a control unit of the welding device 100, which controls the movement and the travel distance of the lens L. The resulting length of the travel distance $x_{res}$ is calculated from a base travel distance $x_0$ and the correction value $\Delta x$:

$$x_{res} = x_0 \pm \Delta x.$$

By means of the control unit, the lens L is now moved in the direction of the housing G along the previously identified, resulting travel distance $x_{res}$, along with a welding of the lens L to the housing G performed therewith, as soon as such comes to rest on the edge region $R_G$ of the housing G through the edge region $R_L$ of the lens L. The welding is carried out, for example, by means of a friction welding process.

Figure 2:
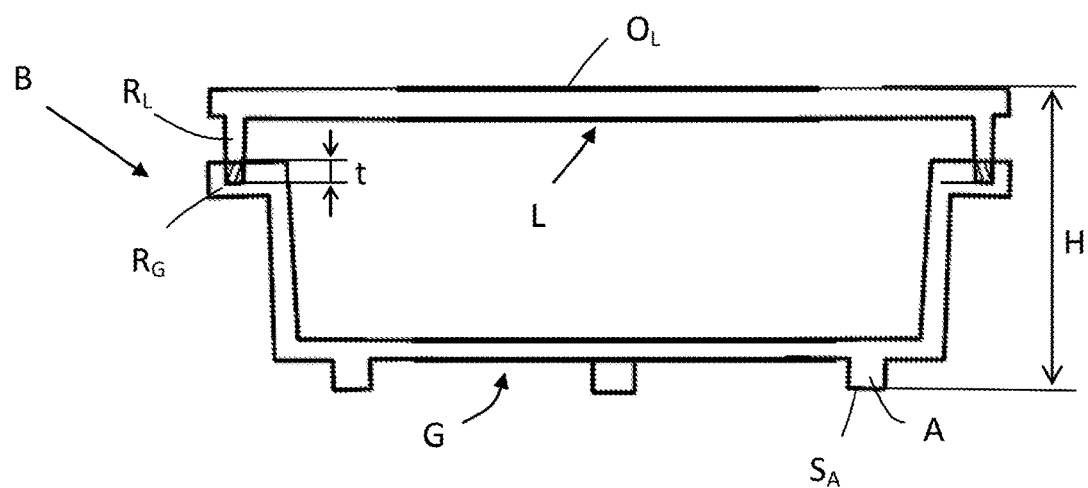
FIG. 2 is a schematic representation of the welding device shown in FIG. 1 at the completion of the joining process according to the invention.

The movement of the lens L over the previously determined length of the travel distance $x_{res}$, in a welded state of the lens L to the housing G, as shown in FIG. 2, ensures a defined target height H of the lighting device B, measured from the reference surface $S_A$ of one or more of the fastener A to the top surface $O_L$ of the lens L facing away from the housing G. All lighting devices B manufactured or joined in such a manner have such an equally high target height H, so that it can be ensured that during installation of the lighting devices B in the body of a motor vehicle, these always sit flush with the outer skin of the motor vehicle.

The indentation depth t, also called welding depth, of the edge region $R_L$ of the lens L into the edge region $R_G$ of the housing G, resulting during the welding operation, can have a different value for each lighting device B so that the tolerances of the lens L made of plastic and of the housing can be compensated over the different indentation depths t without changing the dimensions, in particular the target height H of the finished, joined lighting devices B.

The invention is not limited in its execution to the above preferred embodiment. Rather, a number of variants are conceivable, which makes use of the illustrated solution even with fundamentally different embodiments. All of the features and/or advantages arising from the claims, the description or the drawings, including design details, spatial arrangements and method steps, can be essential to the invention both by themselves and in various combinations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A method for joining a lens with a housing of a lighting device for a motor vehicle, the method comprising:

positioning the housing in a receiving device of a welding device, an underside of the housing having at least one fastener for attaching the lighting device in the motor vehicle;

identifying a position of the at least one fastener relative to the receiving device to obtain a correction value;

moving the lens, which is held in a holding device of the welding device, along a travel distance in the direction of the housing; and welding the lens to the housing, wherein a length of the travel distance is corrected by the correction value such that in a welded state of the lens to the housing, a defined target height of the lighting device is created, the defined target height being measured from a reference surface of the at least one fastener to an upper surface of the lens facing away from the housing.

2. The method according to claim 1, wherein the housing is positioned in the receiving device, such that the reference surface of the at least one fastener is oriented toward an inner surface of the receiving device.

3. The method according to claim 2, wherein the position of the at least one fastener is determined by identifying a distance between the reference surface of the at least one fastener and the inner surface of the receiving device, the distance between the reference surface of the at least one fastener and the inner surface of the receiving device being the correction value.

4. The method according to claim 1, wherein the position of the at least one fastener is identified by a sensor element.

5. The method according to claim 1, wherein the correction value is transmitted to a control unit of the welding device, which controls the travel distance of the lens or the travel distance of the housing.

6. The method according to claim 1, wherein the welding of the lens to the housing is terminated upon reaching the defined target height.

7. The method according to claim 1, wherein the welding is carried out by a concurrent ablation process.

8. The method according to claim 1, wherein the at least one fastener includes two or more fasteners, wherein the position of the two or more fasteners is identified, wherein a mean value is calculated from the positions of and wherein the correction value is based on the mean value.

9. A welding device for joining a lens with a housing of a lighting device for a motor vehicle, the welding device comprising:

a receiving device for receiving and positioning the housing;

a holding device for holding and moving the lens; and a welder for welding the lens to the housing, wherein the receiving device comprises a sensor element via which a position of at least one fastener of the housing relative to the receiving device is identified so as to obtain a correction value and the lens is moved along a travel distance when welding to the housing, wherein a length of the travel distance is corrected via the correction value such that in a welded state of the lens to the housing, a defined target height of the lighting device is created, the defined target height being measured from a reference surface of the at least one fastener to a top surface of the lens facing away from the housing.

10. The welding device according to claim 9, wherein the sensor element is arranged on an inner surface of the receiving device.

* * * * *